United States Patent [19]

Petzold

[11] 4,220,058
[45] Sep. 2, 1980

[54] ELECTRONIC CONTROL SYSTEM FOR AUTOMATIC TRANSMISSION

[75] Inventor: Werner P. Petzold, Harwood Heights, Ill.

[73] Assignee: Borg-Warner Corporation, Chicago, Ill.

[21] Appl. No.: 939,029

[22] Filed: Sep. 1, 1978

[51] Int. Cl.² ............................................. F16H 3/74
[52] U.S. Cl. ...................................... 74/751; 74/866; 192/15; 364/426
[58] Field of Search .............. 74/751, 866; 192/109 F, 192/15; 364/426

[56] References Cited

U.S. PATENT DOCUMENTS

| | | | |
|---|---|---|---|
| 3,470,770 | 10/1969 | Fisher | 74/751 |
| 3,719,096 | 3/1973 | Sprague | 74/866 X |
| 3,881,368 | 5/1975 | Furuhashi | 74/866 |
| 3,983,766 | 10/1976 | Forster | 74/866 |
| 4,031,782 | 6/1977 | Miller | 74/866 |
| 4,073,204 | 2/1978 | Dick | 74/866 |
| 4,107,776 | 8/1978 | Beale | 74/866 X |
| 4,117,747 | 10/1978 | Windsor | 74/866 |

*Primary Examiner*—Nile C. Byers, Jr.
*Attorney, Agent, or Firm*—James E. Tracy

[57] ABSTRACT

An upshift gear ratio change is made in an automatic transmission by monitoring the driveline torque and operating a closed loop control system in response to that torque to in turn control the torque to obtain a desired shift. Shift quality is optimized, while torque transients are minimized, by initially closing the loop at the end of the static phase of the upshift when the driveline torque drops to its minimum turnaround point, the torque thereafter being controlled such that it increases from the turnaround point at a specified rate and in accordance with a predetermined first ramp command. As the increasing driveline torque then reaches a prescribed reset level, at an early stage in the dynamic phase, the closed loop control system is released and reset in order to control the torque in accordance with a second ramp command, the second ramp, that the torque is made to follow, thereby starting at a higher level than the first ramp. By initially closing the loop at the relatively low turnaround point undesired torque transients are precluded, and then by resetting the loop shortly thereafter, so that the torque ramp starts at a relatively high level, shift duration is maintained at a desired length and shift quality is enhanced. As a result, each time there is an upshift in the transmission there will be a smooth transition from the original engine speed to the new engine speed.

9 Claims, 12 Drawing Figures

ELECTRONIC CONTROL SYSTEM FOR AUTOMATIC TRANSMISSION

BACKGROUND OF THE INVENTION

This invention relates to a control system for regulating the change of gear ratio in an automatic transmission. Control of the gear ratio change, to in turn control the speed ratio, is usually accomplished by means of a hydraulic system having a hydro-mechanical control valve mechanism for modifying the pressure applied to various friction elements in the transmission and to selectively hold and release different components of a planetary gear set. For example, the engine output shaft can be connected to drive the sun gear of such a set, which also includes a plurality of planet gears rotatable on a carrier element and disposed between the sun gear and the other ring gear. When the ring gear is held against rotation, output drive torque is available from the planet carrier at a first speed ratio. To change ratio, the sun gear is locked to the outer ring gear, which is no longer held against rotation, thereby providing a direct drive connection. This is the operation which occurs in a typical upshift.

The shift quality should be optimized in order to achieve a smooth transition from the original engine speed to the new engine speed. In general, it is not desirable to have a shift of very brief duration, as this produces a jerk by the rapid change in vehicle acceleration, which is very noticeable and found objectionable by most drivers. On the other hand, if the shift time is stretched out for too long a period, undue wear is imposed on the friction elements of the transmission. Therefore, the optimum shift quality occurs somewhere between the too-short time duration, producing the objectionable jerk sensation, and the too-long time duration producing the objectionable component wear. For a good positive upshift with a good "feel" the output drive torque should not be allowed to dip too low at the start of the dynamic phase of the shift. Otherwise, there will not be a smooth decrease in engine speed. The speed will tend to remain constant at the beginning of the shift and will then change abruptly. A comprehensive treatment of this subject has been provided by F. J. Winchell and W. D. Route in "Ratio Changing the Passenger Car Automatic Transmission," which appears as Chapter 10 in the SAE publication "Design Practices—Passenger Car Automatic Transmissions," Copyright by the Society of Automotive Engineers, Inc., 1973. In particular, FIG. 21 of this chapter depicts speed, torque and pressure variations during a power-on upshift.

A significant advance in ratio-changing control has been achieved in an electronic control system described and claimed in U.S. Pat. No. 4,031,782, which issued on June 28, 1977 in the names of Alan L. Miller and John S. Ivey, and which is assigned to the assignee of the present invention. Shift quality of an upshift in an automatic transmission is optimized in that patent by employing a closed loop control system which regulates the energization of the on-coming friction element, to change the gear ratio, in response to a feedback signal which varies as a function of the transmission output torque or driveline torque. More specifically, a transducer is positioned to sense the driveline torque to provide the feedback or torque-indicating signal and a control valve operates in response to an error signal, which is a function of the feedback signal, to vary the fluid pressure that controls the on-coming friction element. As the fluid or control pressure increases, the torque likewise increases. With such a closed loop arrangement, the driveline torque can be controlled so that during dynamic phase of an upshift the torque will increase linearly at a desired rate and follow a desired ramp. If the torque tends to vary from the desired ramp function, the error signal automatically changes to vary the control pressure in order to vary the operation of the control valve, and consequently, the on-coming friction element, to correct the driveline torque so that it returns to the desired ramp. For example, if the torque increases above the desired ramp, the control pressure automatically compensates (namely, drops) to return the torque to the value desired. Hence, the shift quality may be optimized.

The present invention is an improvement over that disclosed in U.S. Pat. No. 4,031,782. In that patent the loop is closed, to program the torque increase, at the end of the static phase of an upshift when the off-going friction element (a one-way clutch) releases and the torque dips to its minimum turnaround level. As the control pressure, on the on-coming friction element, increases during the static phase, the torque decreases. But during the dynamic phase, an increase in control pressure will result in an increase in torque. Hence, if the loop is closed, to start the ramp, before the turnaround point, the sensed torque will result in the development of an error signal that calls for an increase in the control pressure. By turnaround the control pressure would then be relatively high, giving rise to an undesirable torque transient which the closed loop control system may not be able to compensate fast enough. The shift quality may therefore be deleteriously affected in the aforementioned patent unless the loop is closed at turnaround. Unfortunately, in practice, the torque dips may vary in magnitude. As a consequence, by starting the ramp at the turnaround point, there may be times when the torque will begin its increase from a level so low that the shift will have a poor "feel" and shift quality will be adversely affected.

The aforementioned considerations concerning the point of loop closure, and the adverse effects on shift quality, will be especially significant if the off-going element is not a one-way clutch, but is a friction element whose disengagement must be effected by the release of hydraulic pressure. In this case, the magnitude of the torque dip, during the static phase, will be affected by the amount of overlap of the off-going friction element releasing and the on-coming friction element engaging. If the off-going element is released too soon, the driveline torque will also drop, and engine speed flare-up will result.

The present invention insures that the desired shift quality, without noticeable torque transients, always occurs even in the presence of varying conditions and even though the torque dips may vary in magnitude from one shift to the next.

SUMMARY OF THE INVENTION

The electronic control system of the present invention regulates the change of gear ratio in an automatic transmission having a pair of friction elements and an output mechanical driving connection for supplying driveline torque to a load, where an upshift change of gear ratio has an initially occurring static phse, during which one of the friction elements is released and the driveline torque drops to a minimum turnaround level, and a subsequently occurring dynamic phase during which the other friction element is engaged and the driveline torque increases from the turnaround point until the upshift is completed. Monitoring means are included in the electronic control system for the sensing the driveline torque at the transmission output driving connection and for producing an output torque signal which varies as a function of the driveline torque. A closed loop control system is provided having a loop which, when closed, controls the engagement of the on-coming friction element to regulate the driveline torque. Detecting means respond to the output torque signal for closing the loop, when the driveline torque is generally at its turnaround point, and for causing the driveline torque to increase, from the turnaround point, under the control of a predetermined first ramp command. Finally, there are reset means which respond to the output torque signal for releasing and resetting the closed loop control system when the driveline torque increases to a predetermined reset level during the dynamic phase, the driveline torque thereafter increasing from the reset point, under the control of a predetermined second ramp command, until the shift is completed.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which like reference numbers identify like elements, and in which:

GENERAL BACKGROUND DISCUSSION

Figure 1:
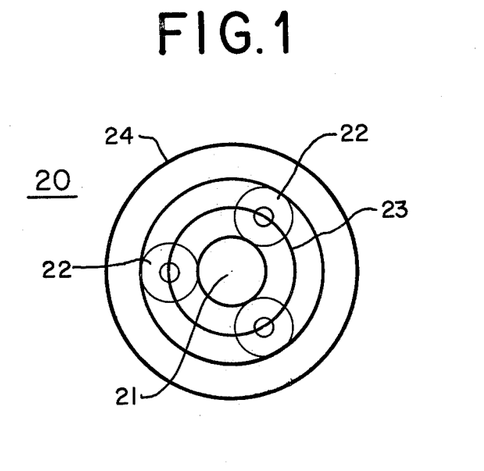
FIGS. 1 and 2 are simplified diagrams indicating basic components of an automatic transmission.
Figure 2:
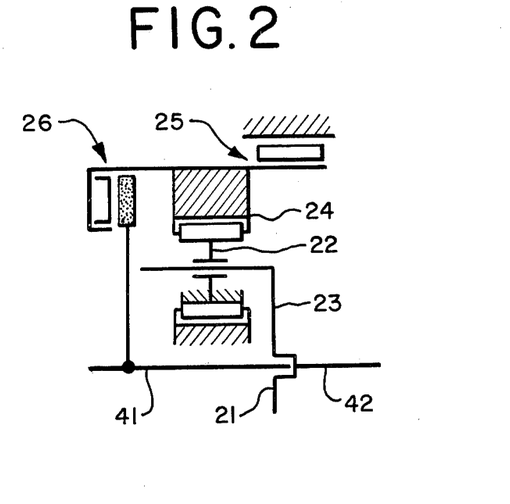

FIGS. 1 and 2 show a general arrangement of a planetary gear set 20, of a type which may be used in automatic transmissions. Planetary gear set 20 is adapted to provide a drive relationship between a drive shaft 41 and a driven shaft 42. A sun gear 21 is connected to shaft 41, which represents the input mechanical driving connection to the automatic transmission. That is, drive shaft 41 and sun gear 21 receive drive from the engine or other prime mover. Meshed with sun gear 21 are a plurality of pinion gears 22, generally termed "planets" in that they can rotate around the sun gear 21 in addition to rotating upon their own axes. A carrier 23 is provided, connected to driven shaft 42, and has rotatably journalled thereon each of the planet gears 22. Outside the planet gears is a ring gear 24, which has teeth on its inner surface meshing with the teeth of the planet gears as they rotate with respect to the ring gear. In general, when the sun gear 21 is driven with the ring gear 24 held stationary, output drive torque is available from planet carrier 23 and driven shaft 42.

FIG. 2 shows a friction element 25, in the form of a one-way clutch, schematically illustrated as connected between a stationary member and ring gear 24. Those skilled in the art will appreciate that a band or other reactive member can be used in lieu of a one-way clutch. A friction clutch 26 is schematically illustrated as engageable to connect ring gear 24 and sun gear 21 for rotation together.

If the ring gear 24 is locked against rotation, then the planet gears 22 are rotated when the sun gear is driven, and output drive at a first reduced speed ratio may be taken from driven shaft 42. When it is desired to change the speed ratios, or shift gears, this is accomplished by releasing the outer ring gear 24 and connecting the ring gear with sun gear 21. This provides a direct drive between the input and output shafts at a second speed ratio of 1:1. Of course, additional combinations of planet and ring gears can be provided to produce a multiplicity of speed ratios in an automatic transmission, but the showing of FIGS. 1 and 2 is sufficient for a background discussion of the ratio changing. One-way clutch 25 holds ring gear 24 against rotation in one direction to establish the reduced drive ratio and permits free rotation of ring gear 24 in the other direction. Clutch 26 is engaged to directly connect the sun gear with the ring gear to provide the second speed ratio.

Figure 3:
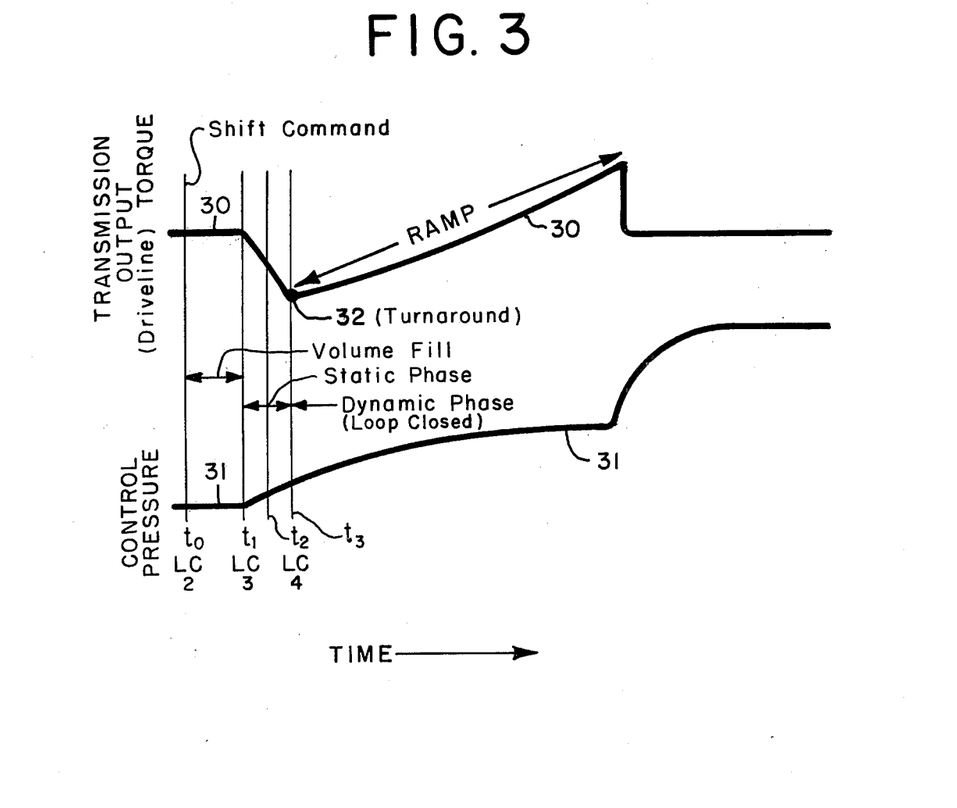
FIG. 3 is an idealized graphical illustration useful in understanding the shift characteristics of an automatic transmission.

FIG. 3 illustrates two different curves 30 and 31, useful in explaining a power upshift. Curve 30 denotes the torque at the transmission output connection, generally termed driveline torque. Curve 31 represents the fluid pressure acting on the piston of the on-coming friction element. At the outset the driveline torque is equal to the engine output times the gear ratio (neglecting efficiency), and the control pressure remains at zero; at time $t_0$ a shift command is initiated. This command can be supplied by the operator or received from a shift point computer in a manner well known and understood by those skilled in the art. Basically, a shift point computer continuously monitors the wheel speed, throttle position and shift pattern lever and these parameters are compared with a pre-programmed shift schedule to determine when to execute a speed change or upshift. Between time $t_0$ and time $t_1$, the transmission remains in the "volume fill" phase of the shift operating sequence, as the piston volume of the actuator is being filled with virtually no change in the control pressure and no change in the torque. This occurs because even though fluid is being admitted under pressure to engage the friction element, there is a certain amount of slack, or open space in the piston; this volume must be filled before there is an actual physical engagement of the friction element with the reaction member. At time $t_1$ the static phase of the shift sequence is commenced, as the on-coming friction element begins to apply torque to its associated gear or other component while at the same time the off-going friction element begins to release. In the static phase, from $t_1$ to $t_3$, the control pressure increases while the torque decreases, but there is no change in the engine speed. A feed-forward circuit aids in the transition from the fill mode of operation, to fill the piston volume, to closed loop operation which commences at the end of the static phase, as will be explained hereinafter.

At time $t_2$, the system is half-way through the static phase of the shift. Subsequently, it will be apparent that the system generates a particular logic command signal for use at this time, but for the present it is sufficient to note that the control pressure is still rising at time $t_2$, and the driveline torque is still dropping as the on-coming friction element continues to apply a force to its associated gear. At time $t_3$ the static phase of the shift is completed, friction element 25 is completely released, and the driveline torque has dropped to a minimum turnaround level as shown at point 32 on the torque curve 30. Ideally, the off-going friction element should release at the instant at which the torque on it is reduced to zero (this will essentially be the case if the off-going element is a one-way clutch). If the off-going friction element is released too early, the transmission would temporarily be in neutral, resulting in engine speed flare-up, which is undesirable. On the other hand, if it is released late, the transmission would momentarily tend to "lock-up", the result being an increase in the magnitude of the torque dip. The driveline torque begins to increase from its turnaround point 32 and this starts the dynamic phase of the upshift. It is generally at the turnaround point that the control loop of the system is closed, as will be explained hereinafter.

The increase in driveline torque, from its turnaround point, can be made to occur over a short, medium or long time span. If the shift is accomplished in a relatively short time, the result will be poor "feel," or an objectionable jerk being felt by the driver. If the dynamic phase of the shift is extended over a very long time, this imposes excess wear on the on-coming friction element (which is slipping). Moreover, if the driveline torque starts its increase from a level which is too low, a poor "feel" will also be experienced by the driver since the engine speed will remain relatively constant well into the dynamic phase and then will abruptly drop. One satisfactory compromise is represented by the ramp-shaped portion of curve 30 in FIG. 3. This means that the shift occurs over a sufficiently brief time duration so that excess component wear is not caused, and likewise that the driver does not feel a jerk or rapid transition in the shift and there is a smooth deceleration of the engine. A discussion of the shift quality is set out in the "Power-On Upshift" section of the SAE reference noted previously. It is toward the achievement of a good quality shift, with a good "feel," that the present invention is directed.

DESCRIPTION OF THE PREFERRED EMBODIMENT

Figure 4:
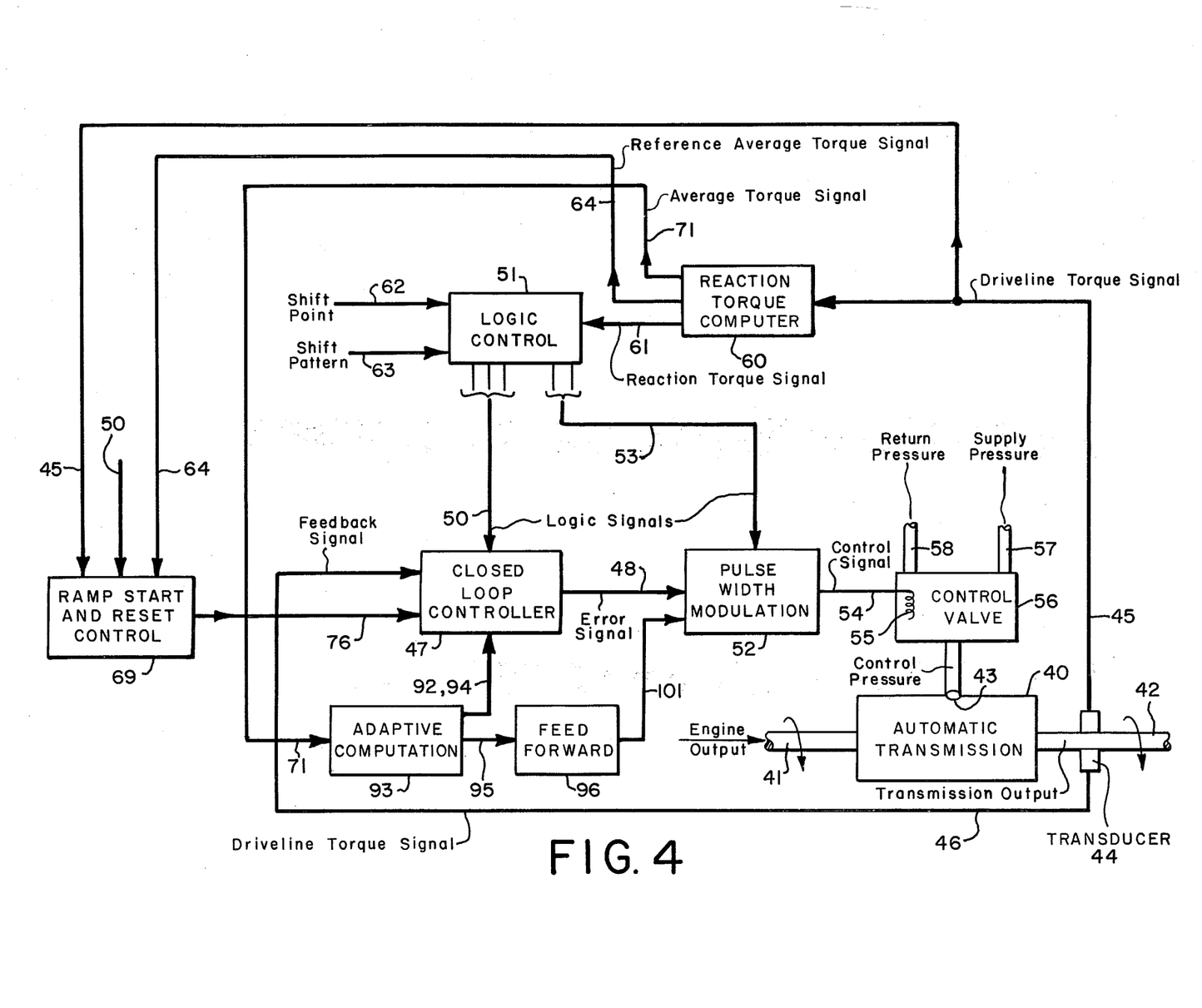
FIG. 4 illustrates, in simplified block diagram form, an electronic control system, constructed in accordance with the present invention, and the manner in which that control system couples to and regulates an automatic transmission.

FIG. 4 depicts in a block arrangement an electronic control system for changing the gear ratio in an automatic transmission 40. An input shaft 41 represents the input mechanical driving connection to the transmission, and this is normally coupled to the output of the engine or other prime mover. The output driving connection of the transmission, which would be taken from the carrier as described above, is represented by the shaft 42. This shaft is normally coupled to a shaft for driving the vehicle wheels. In addition, the transmission includes at least one fluid inlet 43 for receiving a fluid under pressure to control the friction element and thus control the change of gear ratio.

A transducer 44 is positioned to sense the driveline torque at the output driving connection of the transmission, and to provide an electrical signal, which is a function of the output torque, on each of lines 45 and 46. One particular form that transducer 44 may take is illustrated and described in detail in the aforementioned U.S. Pat. No. 4,031,782. However, any suitable monitoring means may be employed so long as it produces an output torque signal which varies as a function of the driveline torque. A closed loop controller 47 comprises a plurality of components, as will be explained hereinafter, for providing an error signal on line 48 as a function of both the output torque or driveline torque signal, received as a feedback signal over line 46, and a plurality of logic command signals received over line 50 from a logic control circuit 51. The error signal on line 48 is applied to a pulse width modulation circuit 52, which also received a plurality of logic command signals over line 53 from the logic control circuit. The output signal from the pulse width modulation circuit 52 is a control signal which is applied over line 54 to a winding 55 which is a part of an electrohydraulic control valve 56, the output side of which is coupled to the inlet 43 of the automatic transmission. Conduit 57 is connected to receive a fluid under pressure from a pump (not shown) in a manner well known and understood in this art.

A reaction torque computer or computation circuit 60 is connected to receive the output torque signal over line 45 and produce, on output line 61, a simulated reaction torque signal (which very closely approximates the instantaneous reaction torque) for application to the logic control circuit 51. The reaction torque is not measured directly but is derived as a function of the driveline torque. In effect, computer 60 tracks the reaction torque during the static phase of a shift in order to determine when various logic signals should occur. Of course, the reaction torque is that which holds the off-going friction element. As that friction element releases, the reaction torque reduces to zero.

Logic control circuit 51 also receives a signal over line 62, representing a shift point, to indicate the issuance of a shift command. A shift pattern signal can be generated and supplied over line 63 to the logic control circuit 51. The shift pattern signal on line 63 is that provided when the driver moves the shift lever into a position (that is, a position such as "park," "reverse," "neutral," "drive" and so forth) which changes the operation of a control valve (not shown), and "tells" the electrical system which control valve is to be operated. The shift point signal on line 62 is derived from a unit (not shown) which issues a signal when a shift—up or down—should be initiated. Electronic systems for providing this signal are also available. For purposes of this explanation, conductor 62 is considered as means for providing a shift point signal, and conductor 63 is deemed means for providing a shift pattern signal. The logic control circuit 51 receives the reaction torque signal, the shift point signal and the shift pattern signal (an explanation of the shift pattern signal is not necessary to an understanding of the basic system operation), and provides a plurality of logic command signals for application over the output cables 50 and 53 to effect the operation of components within closed loop controller 47 and the operation of pulse width modulation circuit 52. The reaction torque computation circuit 60 is an important component of the system.

Reaction torque computation circuit 60 also provides an average torque level signal on line 71, by averaging the instantaneous torque signal received from the transducer 44 over a given time period. This average torque signal is applied to an adaptive computation circuit 93, which produces output signals that vary as a function of the average torque level. The first output signal from adaptive computation circuit 93 is applied over line 92, 94 as an input command signal to closed loop controller 47. This first output signal affects the controller operation and varies both (1) the slope of the ramp portion of torque curve 30, and (2) the gain of the closed loop controller. The second output signal from adaptive computation circuit 93 is applied over conductor 95 to a feed-forward circuit 96, which in turn passes a signal over line 101 to pulse width modulation circuit 52. The feed-forward circuit in effect prepares the control valve 56 for closed loop operation. Hence, the adaptive computation circuit 93 and the feed-forward circuit 96 improve the overall regulation of the closed loop control system.

The average torque signal at the time $t_1$ is applied, as a reference average torque signal, over line 64 to a ramp start and reset control circuit 69 to which is supplied, over line 45, the driveline torque signal from transducer 44. Circuit 69, which also receives some of the logic command signals on cable 50 and couples over line 76 to an input of closed loop controller 47, determines and initiates the start of the ramp shaped torque increase. More specifically, circuit 69 supplies a command signal over line 76 and causes the loop to close when the driveline torque is generally at its turnaround point and at the beginning of the dynamic phase, whereupon the driveline torque is made to increase, from the turnaround point, under the control of a first ramp command. When the driveline torque thereafter reaches a predetermined reset level, at an early stage of the dynamic phase, circuit 69 issues another command signal over line 76 and resets the closed loop control system to cause the torque to follow a second ramp command until the shift is completed.

DETAILED DESCRIPTION OF THE INVENTION

Figure 5:
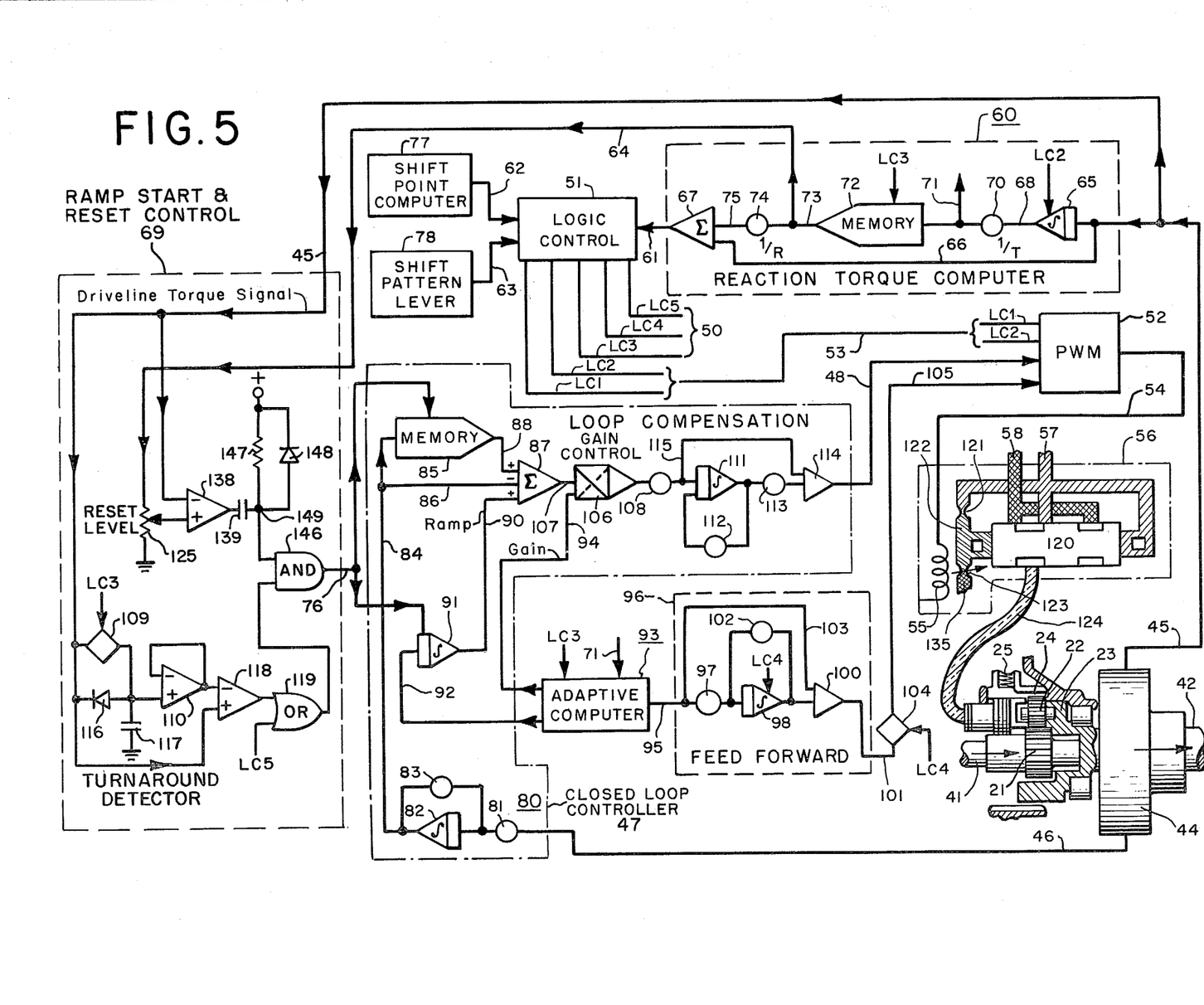
FIG. 5 is a block diagram, partly in schematic form, illustrating the electronic control system of FIG. 4 in much greater detail.

FIG. 5 depicts the basic electronic control system of the invention in more detail. Reaction torque computer 60 is shown to include several stages, with the line 45 being coupled both to the input of an integrating stage 65 and, over line 66, to one input connection of a summation stage 67. The output of integrating stage 65 supplies the integrated torque signal over line 68 to a passive circuit 70, which is effective to multiply the signal on line 68 by the ratio 1/T, representing a time division to produce on line 71 a signal which represents the average driveline torque provided on shaft 42 over the time period T. The application of a logic command signal LC2 to the integrating stage 65 and LC3 to the memory stage 72 are shown, with each logic command signal being generated by the logic control circuit 51 as will be explained hereinafter. The average driveline torque signal (for the time T) is stored in memory stage 72 in response to command signal LC3 (which occurs at time $t_1$). The stored signal, called the reference average torque signal, is continuously applied over line 73 to the passive stage 74, effective to multiply this signal by 1/R or provide on line 75 a signal which represents the average driveline torque at time $t_1$ adjusted for the gear ratio R. This signal on line 75 is applied to the other input of summation stage 67, which then provides the reaction torque signal on line 61 for application to the logic control circuit 51. As the off-going friction element is released, the reaction torque signal decreases from a positive level (and therefore is negative-going) down to zero, at which time the reaction torque is zero.

Those skilled in the art will appreciate that the reaction torque computer circuit 60 is depicted with simplified analog components connected to provide a reaction torque signal on line 61 as a function of a received instantaneous torque signal on line 45. This is done with the illustrated integrating, memory, divide down and summation stages. It will be apparent that a microprocessor or other digital circuits can be connected to operate in a known fashion to produce the reaction torque signal on line 61 in response to the received instantaneous torque signal on line 45. Hence, the terms "reaction torque computation circuit," "ramp start and reset control circuit," and "adapative computation circuit," as used herein embrace botth the analog and digital forms of such circuits which are well known and understood in this art.

Shift pointer computer 77 continuously monitors the wheel speed, throttle position and shift pattern lever and compares these parameters with a pre-programmed shift schedule and provides a signal on line 62 to the logic control circuit 51 when a shift command is initiated. Likewise, a shift pattern lever 78 is conventionally used to provide the shift pattern signal on line 63 to the logic control circuit.

The instantaneous driveline torque signal on line 46 is applied as shown to the closed loop controller 47, and is initially applied to a feedback filter circuit 80. The signal passes through a first passive component 81 and an active stage 82; a passive component 83 is coupled in parallel with stage 82. The passive components depicted by the circular symbols (such as 81, 83) can be implemented by the use of a fixed or variable resistor. Filter circuit 80 provides a filtered output signal on line 84 which is applied both to the input side of a memory stage 85 and, over line 86, to one of the input connections of a summation stage 87, which also receives second and third input signals. The second input signal is received over line 88 from memory 85, which receives not only the filtered input signal on line 84 but also receives a command signal over line 76 from the ramp start and reset control circuit 69.

All of the logic command signals (LC1-LC5) are operational mode signals. As will be explained further, they issue in a time sequence to regulate the operational state of other components (as is also the case with the command signals on line 76), rather than provide information or command input signals to those components. As will also be understood later, during a given shift the LC5 command signal may or may not be effective, depending on the magnitude of the torque dip. The third input signal received by summation stage 87 is received over line 90 from another active stage 91, an integrator stage which is connected to provide, when the loop is closed, a ramp slope signal as a function of a level or amplitude signal received over line 92 from adaptive computer 93. The integrator 91 also receives the command signals on line 76. Thus, stage 87 receives a feedback signal on line 86, and on lines 88 and 90 receives ramp-determining signals which are collectively termed the "input command" signal. As will be apparent, for each upshift two command signals are usually supplied over line 76. The first signal closes the loop approximately at turnaround and imposes a first ramp command on the torque, and the second signal on line 76 resets the loop, early in the dynamic phase, and places the driveline torque under a second ramp command until the completion of the shift.

The adaptive computer 93 in FIG. 5 includes three circuits, which will be described hereinafter, each of which receives, from the reaction torque computer, the signal on line 71 denoting the average driveline torque during the time period T. Each of the three circuits in computer 93 also receives the LC3 logic command signal. The instantaneous driveline torque varies because of the engine variations, torsional vibrations, wheel slip and other irregularities. Hence, an average signal must be provided to avoid erroneous operation of the system and this averge signal must be provided in a preset time frame during the shift sequence. To afford an idea of the operating times, the time duration from $t_1$ to $t_2$ (FIG. 3) is about 50 milliseconds. From the average torque signal on line 71 and the information stored in the adaptive computer, a level signal is provided on line 92 to regulate the torque during the shift period, in that it generally controls the slope of the ramp of the torque curve as represented by curve 30 in FIG. 3. The adaptive computer 93 also provides a gain-control signal on line 94, and a third output signal on line 95 which is coupled to the feed-forward circuit 96. When the loop is closed, in response to a command signal received over line 76 from circuit 69, integrating stage 91 is triggered into operation by that command signal to provide a ramp-shaped signal on line 90. The command signal is also applied to memory 85 in order to store the level of the torque signal on line 84 at the instant the command signal occurs, the stored level being continuously provided at the output of memory 85.

Turning now to a description of ramp start and reset control circuit 69 in FIG. 5, line 45 applies the driveline torque signal from transducer 44 to one input of an active element 109 which operates as a normally-closed switch that is opened in response to the application of an LC3 logic command signal to the switch's other input. The output of switch 109 is coupled to the non-inverting or (+) input of an operational amplifier 110 which is connected to form a voltage follower. The torque signal on line 45 is also applied to the (+) input of voltage follower 110 via a diode 116, and a capacitor 117 couples the (+) input to a ground plane of zero reference potential. Line 45 also connects to the non-inverting or (+) input of an operational amplifier 118 which constitutes a comparator, the inverting or (−) input of comparator 118 receiving the output signal from voltage follower 110.

When switch 109 is closed (as is usually the case) the output torque signal on line 45 is supplied through voltage follower 110 to the (−) input of comparator 118 without any phase change. When the switch is opened by an LC3 logic command signal, the torque signal will be supplied, via diode 116, to voltage follower 110 and thence to comparator 118, but only if that torque signal is negative-going, namely decreasing in amplitude. In order to provide noise immunity, the voltage follower has a small amount of gain so that when the torque signal appears at the (+) input of the voltage follower 110 it will manifest at the (−) input of comparator 118 at a slightly higher voltage level (for example, around 0.2 volts) than the torque signal appearing at the (+) input of the comparator. In this way, anytime switch 109 is closed, or when the switch is open and a negative-going torque signal flows through diode 116, the signal voltage at the (−) input of comparator 118 will be greater than that at the comparator's (+) input, thereby providing a substantially zero potential or logic "0" at the comparator's output.

The output of comparator 118 connects to one input of an OR gate 119, the other input of which receives the LC5 logic command signal. The output potential of OR gate 119 is relatively high, namely logic "1," when a logic "1" signal appears at either of its inputs. As will be made apparent, the output of OR gate 119 will switch to logic "1," to effect closing of the loop, either when the reaction torque signal, which approximates the torque of the off-going friction element, drops to zero, or at turnaround, whichever occurs first. The logic "1" output of gate 119 is applied to one input of an AND gate 146 whose other input is normally established at a logic "1" level. When both of the inputs of AND gate 146 are at logic "1," the gate's output will be logic "1." Such a logic "1" signal provides a command signal on line 76 for initiating the operation of integrator 91 to provide a ramp-shaped signal and for storing in memory 85 the instantaneous torque level on line 84.

The reference average torque signal, appearing on line 64, is determined at time $t_1$ (namely, at the occurrence of an LC3 logic command signal) which is immediately prior to the static phase of the upshift. The reset level, at which the closed loop control system is released and reset, is determined by the setting of potentiometer 125 which receives the reference average torque signal. The variable tap of the potentiometer is coupled to the non-inverting or (+) input of an operational amplifier 138, functioning as a comparator, the (−) input of the comparator being coupled to line 45 to receive the driveline torque signal. Normally, circuit junction 149 is at a relatively high potential, or logic "1," so the upper input of AND gate 146 is normally at logic "1." As long as the driveline torque signal is negative relative to the reset level, the potential at the (+) input of comparator 138 will be greater than (or positive with respect to) that at the (−) input, as a consequence of which the output of the comparator will be at a relatively high voltage level, or logic "1," and the upper input of AND gate 146 will remain at logic "1." However, anytime the driveline torque signal increases from below the reset level to that level, the (−) input of comparator 138 becomes positive relative to the (+) input and the output voltage of the comparator drops to substantially zero or logic "0." Capacitor 139, resistor 147 and diode 148 form a differentiating circuit to produce, in response to the negative-going output voltage, a narrow negative-going reset pulse or "spike" at the circuit junction 149 for application to AND gate 146. In other words, at the instant the increasing driveline torque reaches the reset level the upper input of AND gate 146 momentarily is established at logic "0," whereupon the output of gate 146 becomes logic "0" and memory 85 and integrator 91 are released. At the termination of the negative-going reset pulse, the potential at junction 149 returns to its normally high potential and the output of AND gate 146 returns to logic "1" to reset integrator 91 and memory 85. When reset, integrator 91 starts the development of a new ramp-shaped signal and memory 85 stores a new torque level, namely the instantaneous value of the torque signal on line 84 at the instant of resetting.

Feed-forward circuit 96 includes a first passive element 97, an active component 98 which receives not only the signal from component 97 but also an LC4 logic command signal (at time $t_2$), and an output active component 100 for providing an output signal from the feed-forward combination on line 101. A passive feedback component 102 is coupled around active stage 98, and a direct signal connection is provided from the input of element 97 over conductor 103 to one input connection of stage 100. This feed-forward circuit is an anticipation circuit for providing a signal over line 101 which tends to terminate the piston volume fill mode of operation, by causing the spool in the control valve to move from the fully open position to an appropriate intermediate position, and thus prepare the control valve for closed loop operation.

The output signal from feed-forward stage 100 is passed over line 101 to another active element 104, which operates as a normally-open switch that is closed upon receipt of an LC4 logic command signal to provide an output signal over line 105 to the pulse width modulation circuit 52. PWM circuit 52 thus receives four input signals: the error signal over line 48 from the closed loop controller 47; the feed-forward compensating signal over line 105; and the logic command signals LC 1 and LC2 from the logic control circuit 51. Because LC1 is only generated and supplied over cable 53 when a signal is produced by movement of the shift pattern lever, this signal need not be further described.

In closed loop controller 47, loop gain control circuit 106 receives both the gain-regulating signal over line 94 from the adaptive computer 93, and an output signal over line 107 from summation stage 87. The output signal from gain control circuit 106 is translated through another passive component 108 to a loop compensation circuit which comprises an active stage including an integration circuit 111, a parallel-coupled passive element 112, another passive element 113 coupled between the output of stage 111 and one input connection of the output stage 114, and a conductor 115 connected to pass a signal directly from component 108 to one input connection of stage 114. The output of stage 114 constitutes the closed loop controller output signal, or the error signal, which is applied to the pulse width modulation circuit 52.

Control valve assembly 56, which includes a spool 120, is constructed as a two-stage control valve. However, by providing a pulse width modulation (PWM) signal to energize winding 55 in the pilot portion of the valve, the valve position can be effectively regulated so that operation similar to that of a continuously variable valve is achieved. Thus, as used herein the term "control valve" includes a conventional (albeit much more expensive) servo valve, as well as the economical two-position valve disclosed herein. The fluid at the supply pressure is provided as shown over a conduit 57 and passes to the right end of spool 120. Some of the supply fluid is also directed to the left and passes through first stage fixed orifice 121 to conduit 122. The first stage variable orifice 123 is regulated by the PWM signal applied to winding 55. Hence, the net flow at the left end of spool 120 is a function of both fixed orifice 121 and the variable orifice 123. The other side of variable orifice 123 is coupled through a channel 135 to the return pressure line 58. The control pressure is provided in line 124, and applied to the transmission for regulating the gear ratio change as described above.

The components of the transmission are also generally shown in FIG. 5, and are numbered in agreement with the general showing of the planetary gear set in FIGS. 1 and 2. The particular transmission controlled by the present invention is not important. Any transmission can be used which provides input and output driving connections, and a gear change controlled by the pressure of the fluid in line 124.

Figure 6:
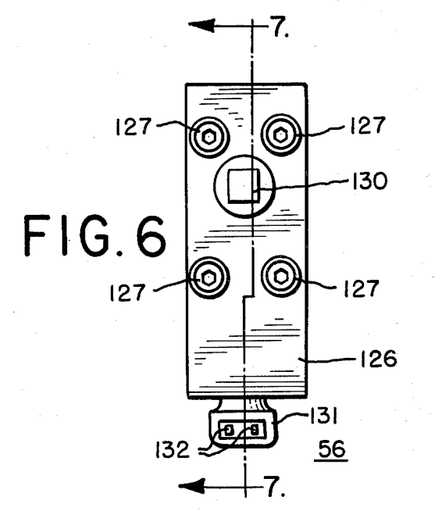
FIG. 6 is an end view and FIG. 7 is a sectional view, illustrating details of a control valve suitable for incorporation into the control system of FIGS. 4 and 5.
Figure 7:
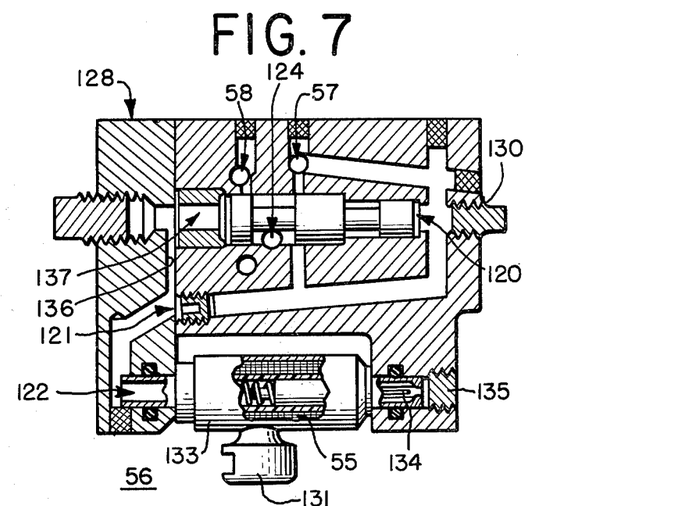

FIGS. 6 and 7 illustrate additional details of the two-position valve 56 used in the control system. The end view of FIG. 6 shows the valve body 126 which is fastened with four screws 127 to the valve body cover 128 (FIG. 7). FIG. 6 also illustrates the stop 130 at the right end of spool 120, and a plug body 131 with a pair of electrical contacts 132 for receiving the conductors carrying the output signal from PWM circuit 52 for application to the solenoid winding 55 within the valve body.

FIG. 7 illustrates the solenoid body 133, with the winding 55 inside the solenoid body. The PWM signal applied to the solenoid winding determines the effective position of plunger 134 and thus regulates the effective opening of the variable orifice 123. The fluid under pressure is admitted through channel 57, and flows to the right and then down, past the right end of spool 120, and then to the left and down to the first stage fixed orifice 121. After this orifice, the major portion of the fluid passes downwardly and to the right through inlet line 122, through the solenoid interior channel, and through variable orifice 123, determined by the average position of solenoid plunger 134. The fluid passing through the variable orifice is then returned through the discharge port 135, which is connected to the same pressure return line as channel 58.

A portion of the fluid which passes through the first stage fixed orifice 121 also passes upwardly through channel 136 to valve stop 137, thus applying a reaction to the left side of spool 120. As this valve is illustrated at full scale, those skilled in the art will readily fabricate a suitable two-position valve or use a valve equivalent to the structure depicted in FIGS. 6 and 7. It is again emphasized that a servo valve, one which is adjustable to any point in a range of positions, can be provided in lieu of the illustrated valve arrangement. However, the economic considerations of implementing the system in the automotive market militate against use of the more expensive servo valve.

Figure 8:
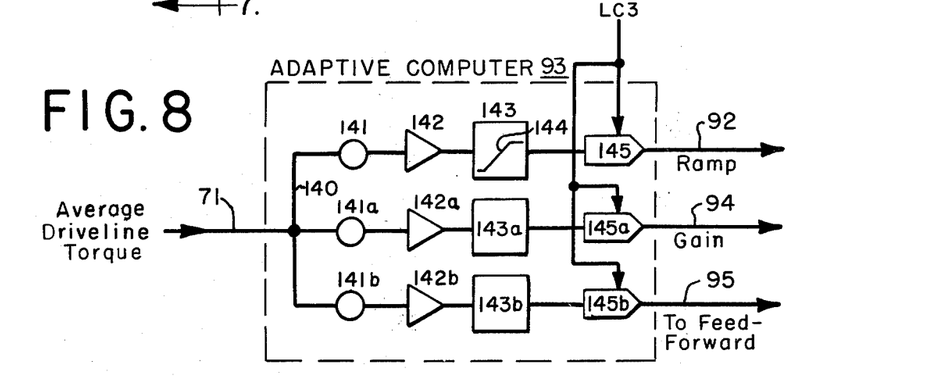
FIG. 8 is a block diagram of an adaptive computation circuit that may be employed in the control system of FIGS. 4 and 5.

FIG. 8 depicts in a simplified form the circuit arrangement of adaptive computer 93, which receives two input signals. The first, on line 71, is a function of the average driveline torque, and the second is a logic command signal LC3 which issues at the beginning ($t_1$) of the static phase of the shift. For example, the torque signal on line 71 is applied over a common conductor 140 to a first passive component 141 for initially adjusting the gain of the received signal, which is then passed through a buffer amplifier 142 to the input of a variable gain amplifier 143. The sloping gain characteristic 144 shown within this amplifier indicates that a preset gain can be provided by selection of the appropriate component to provide the degree of slope and thus the desired gain. The output of the adjustable gain stage 143 is applied to an input of a memory stage 145. This memory stage continually receives the input signal from stage 143 and, when the logic command signal LC3 is received, the signal level then present is stored and continually presented on the output conductor 92 for regulating the ramp portion of the torque curve (FIG. 3). Similar components referenced with the letters "a" and "b" are provided to store and hold signals, on conductors 94 and 95, for application to gain control stage 106 and the feed-forward circuit 96 when the logic command signal LC3 is provided. Other suitable circuits can be utilized to implement the adaptive computation, with the only requirement being the individual modification of the input torque signal on line 71 in the different channels, and the storage of the resulting modified signals at time $t_1$ when LC3 issues.

Figure 9:
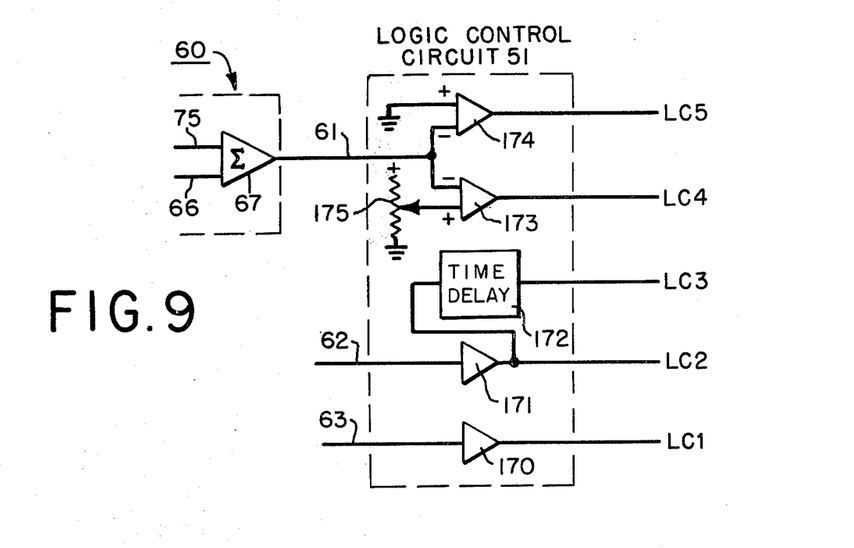
FIG. 9 is a block diagram setting forth details of a logic control circuit useful in the control system of FIGS. 4 and 5; and, FIGS. 10, 11 and 12 are graphical illustrations useful in understanding the operation of the present invention during upshift of the automatic transmission and in the presence of different operating conditions which give rise to different torque dips.

FIG. 9 is a simplified diagram depicting components of logic control circuit 51. The shift pattern signal received on line 63 is ued, after passing through buffer amplifier stage 170, to provide signal LC1 when a downshift is called for by the operating conditions. Since an understanding of the operation of the system during a downshift is not needed to understand the invention, such operation will not be described herein. The shift point signal on line 62 passes through another buffer amplifier 171 to provide the LC2 signal (a logic "1" signal) at time $t_0$ as shown in the idealized diagram of FIG. 3 and the actual graphical illustrations of FIGS. 10, 11 and 12. The output signal from amplifier 171 (FIG. 9) is also translated through a fixed time delay stage 172 to develop the LC3 signal at a predetermined time $t_1$, related to the piston fill volume as previously described.

The simulated reaction torque signal, which is calculated by operating upon the actual torque signal, is applied over line 61 to the (−) input of a first comparator 173 and also to the (−) input of a second comparator 174. A potentiometer 175 provides a positive reference potential which is applied to the (+) input of comparator 173. This comparator stage 173 switches and produces (at time $t_2$) the output logic command signal LC4 (a logic "1" signal) at a percentage of the reaction torque value which is determined by the setting of potentiometer 175. Comparator 174, whose (+) input connects to the zero ground plane, switches from a logic "0" output signal to a logic "1" output signal to provide the LC5 signal when the reaction torque has decreased to zero.

OPERATION OF THE SYSTEM

Figure 10:
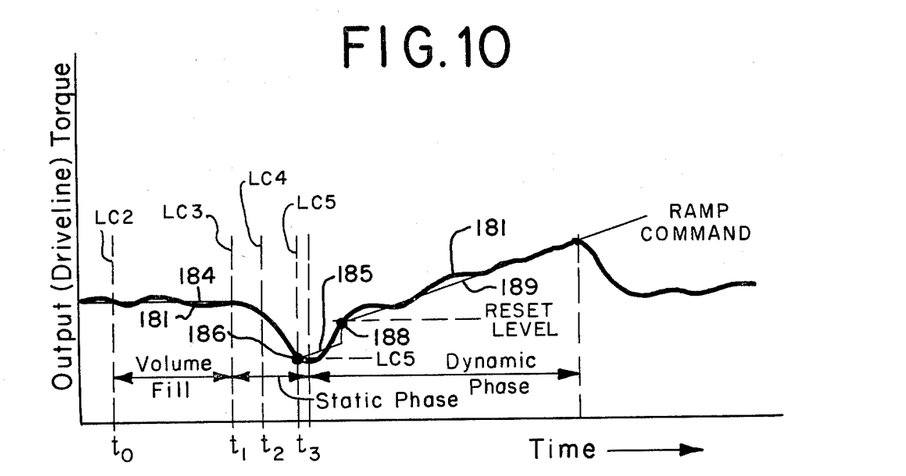
Figure 11:
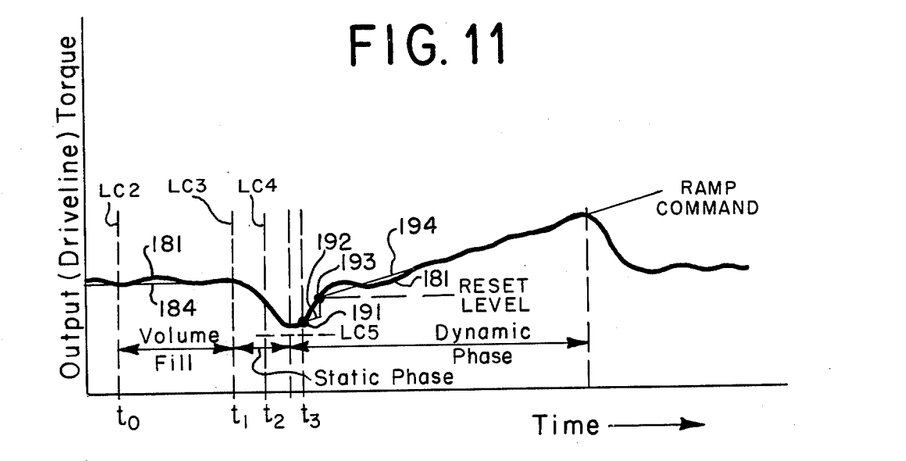
Figure 12:
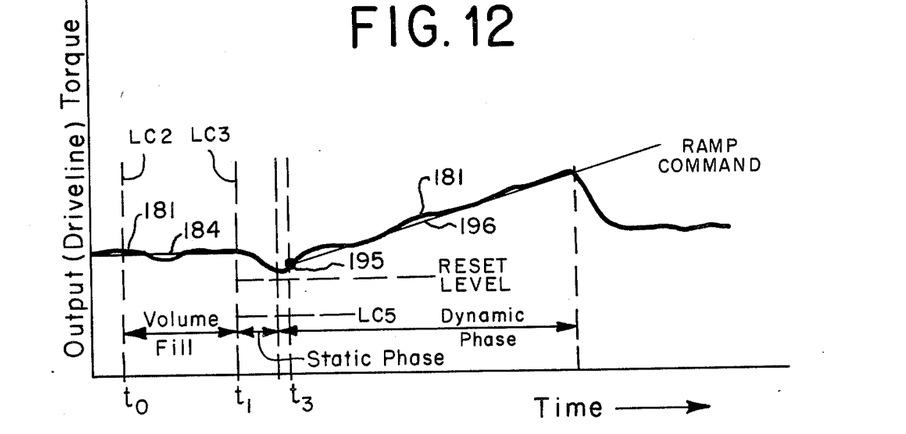

A general perspective of the system operating can best be given in connection with FIGS. 10, 11 and 12 which depict values of the different parameters under three different operating conditions giving rise to torque dips of three different magnitudes. In each of FIGS. 10, 11 and 12 curve 181 represents the actual driveline torque as monitored by transducer 44. The operation of the system will initially be considered in the presence of the greatest torque dip, which is illustrated in FIG. 10.

At the outset the shift command is received from shift point computer 77 over conductor 62 and is applied to logic control circuit 51. As evident from the description in connection with FIG. 9, circuit 51 provides the LC2 logic command signal at time $t_0$, which is applied to PWM circuit 52 and thus immediately begins to modify the position of spool 120 in control valve 56 to commence filling the piston volume. Simultaneously, the LC2 signal is applied to the integrating stage 65 in reaction torque computer 60, so that the stage is rendered operational and begins to integrate the level of the driveline torque signal on line 45. As shown in FIG. 10, the actual driveline torque signal 181 varies at this time above and below an average level indicated by construction line 184. Hence, an average torque signal is being developed and is also being supplied, via line 71, to the input of adaptive computer 93. Subsequently, after a time duration determined by the time delay circuit 172, logic command LC3 is produced at time $t_1$ as shown in FIG. 10, and applied to memory stage 72 in reaction torque computer 60. Thus, the value then present at the input of memory 72, connoting the averaged driveline torque signal, is stored and is continuously presented at the output of memory 72 and on line 64 to provide the reference average torque signal for application to potentiometer 125 of circuit 69. The reference signal at the output of memory 72, after division by gear ratio R, is continuously provided at one input connection 75 of summation stage 67. At the same time, the instantaneous driveline torque value is supplied over line 66 to the other input connection of summation stage 67. The output signal from stage 67 is the difference between the two input signals, and it is this signal on line 61 which simulates the reaction torque. As mentioned, as the offgoing friction element releases, the negative-going reaction torque signal drops from a positive level to zero.

Prior to the development of the LC3 command signal, switch 109 is in its normally-closed condition and the driveline torque signal is applied to both inputs of comparator 118. However, due to the gain of voltage follower 110, the torque signal at the (−) input of comparator 118 will be positive relative to the signal at the (+) input, the output of the comparator thereby being logic "0." As a consequence, line 76 will be at logic "0." Switch 109 opens in response to logic command LC3, whereupon the negative-going torque signal, during the static phase of the shift, flows through diode 116 to voltage follower 110. The output of comparator 118 will remain at logic "0," however, since the negative-going torque signal at the comparator's (−) input will still be positive with respect to the torque signal at the (+) input and line 76 will remain at logic "0."

When the negative-going reaction torque signal on line 61 differs by a certain percentage from a preset torque value—established by the setting of potentiometer 175—comparator 173 switches from a logic "0" output to a logic "1" output to provide the logic command LC4 at time $t_2$. If a one-way clutch is not used as the off-going friction element, this signal LC4 is used to release the band or disc element that retains ring gear 24. In the system of the present invention the command signal LC4 is used to supply the feed-forward signal from circuit 96 to PWM circuit 52 to compensate the control valve 56. The LC4 signal is applied to integrating stage 98, in the feed-forward circuit, so that this stage becomes operational and supplies an initial signal value to one of the inputs of comparator 100. The other input to comparator 100 is the instantaneous signal from adaptive computer 93 which is translated over conductor 103. At time $t_2$ signal LC4 also closes switch 104 and thus supplies the output from the feed-forward circuit to the pulse width modulation circuit. This occurs approximately midway through the static phase of the upshift cycle, as may be noted in FIG. 10.

When the reaction torque drops to zero the negative-going reaction torque signal on output conductor 61 decreases to zero and causes comparator 174 to switch to its logic "1" output to produce command signal LC5. Ideally, the reaction torque (as reflected by the reaction torque signal) reduces to zero at the exact instant that the driveline torque drops to its turnaround level. In the case indicated by FIG. 10, the detected zero reaction torque (which gives rise to command signal LC5) occurs just before the torque turnaround point. In response to the occurrence of the LC5 signal, the loop in the closed loop control system is effectively closed and the driveline torque is controlled so that it increases, from near its turnaround point, under the control of a predetermined first ramp command indicated by construction line 185 in FIG. 10.

More particularly, the LC5 command signal is applied to OR gate 119 to produce a logic "1" signal for application to the lower input of AND gate 146, whose upper input is already established at logic "1." A logic "1" command signal therefore manifests at the output of gate 146 for delivery to memory 85 and integrator 91. Memory stage 85, in response to the command signal from AND gate 146, stores the value of the torque signal then present on conductor 84; this stored torque level is thereafter produced as the output signal on line 88 which is then applied to summation stage 87, in effect determining the level of the point referenced 186 on the driveline torque signal 181 in FIG. 10. At the same time, the command signal on line 76 causes integrator 91 to go operational, providing a continuing ramp-shaped signal on conductor 90 which determines the slope identified by the construction line 185. In effect, line 185 indicates the average torque change which is desired while the loop is closed. It is to be noted that the vertical dashed line labelled LC5 in FIG. 10, and which passes through point 186, also coincides with time t₃. As used in FIGS. 10, 11 and 12 time t₃ indicates the first time that the loop is closed in each of the three shift sequences shown. The signals from the adaptive computer were provided at time t₁ when the static phase of the shift (illustrated in FIG. 10) was initiated, establishing the reference levels for subsequent operation of the stages 106 and 91 at time t₃. At time t₃ the driveline torque then present was locked in by memory stage 85, and the ramp-shaped signal was issued by integrator 91. These two signals on lines 88 and 90, going to summation stage 87, constitute the electrical imput command to the closed loop controller 47, that is they specify the driveline torque that is desired (construction line 185 in FIG. 10). Summation stage 87 also receives the instantaneous driveline torque signal over line 86, and develops an error signal at its output connection 107. The closed loop controller functions to control the driveline torque so that it follows the ramp command indicated by construction line 185. As the torque tends to deviate from the ramp command, corrective measures automatically occur and the error signal causes the driveline torque to return to the required value.

Closing the loop at approximately the turnaround point, as is achieved in accordance with the operation depicted by FIG. 10, insures that no significant torque transient occurs to deleteriously affect the shift quality. However, since the torque dip is relatively deep in FIG. 10, a continuation of the upshift under the control of ramp command 185 until the shift is completed would result in less than optimum shift quality, namely a poor "feel", due to the increased shift time and the delayed and then abrupt engine speed change. Hence, a feature of the invention resides in changing the ramp command, at an early stage in the dynamic phase, in order to start the ramp at a level sufficiently high to produce a good positive shift with a good "feel." This is achieved by releasing and resetting the closed loop control system when the increasing driveline torque signal 181 reaches the predetermined reset level established by the reference voltage derived from potentiometer 125. As the positive-going torque signal at the $(-)$ input of comparator 138 becomes positive relative to the reference voltage at the $(+)$ input, the output of the comparator switches from logic "1" to logic "0," which is converted by the differentiating circuit 139, 147 and 148 to a narrow negative-going reset pulse for momentarily changing the upper input of AND gate 146 from logic "1" to logic "0." The output of gate 146 therefore momentarily switches to logic "0" which releases memory 85 and integrator 91. When gate 146 then returns to a logic "1" output, upon the termination of the reset pulse, memory 85 stores the instantaneous level of the torque signal then present on conductor 84 and provides this stored torque on line 88 for application to summation stage 87. As a result, memory 85 determines the level of the point referenced 188 on the driveline torque signal 181 in FIG. 10. Simultaneously, the resetting of the closed loop system causes integrator 91 to produce a new ramp-shaped signal.

The combined effect of memory 85 and integrator 91 is to provide a new and second ramp command (indicated by the construction line 189) to which the driveline torque is controlled. Thus, by resetting the loop different input information will control the driveline torque. Ramp command 189 reflects the manner in which the torque should increase from the reset point to the completion of the shift. Departures of the actual torque from the ramp command result in error signal changes as necessary to correct the driveline torque so that it returns to the desired programmed increase indicated by line 189. The upshift illustrated by curve 181 in FIG. 10 is therefore of optimum quality and will result in a smooth and linear decrease in engine speed as the upshift progresses.

The operation of the system illustrated in FIG. 11 is that which occurs when the driveline torque does not dip, during the static phase, as much as in FIG. 10 and, in fact, turns around before the reaction torque signal indicates that the reaction torque has dropped to zero. The horizontal dashed construction line labelled LC5 in FIG. 11 indicates the level at which the reaction torque signal would reduce to zero and produce command signal LC5. In the operation depicted by FIG. 11, that command signal will not be issued. Instead, a command signal produced by comparator 118 causes the loop to close when the driveline torque is substantially at its turnaround point.

More particularly, at time t₁ command signal LC3 opens the switch 109. As the amplitude of the torque signal (curve 181 in FIG. 11) on line 45 begins to decrease after time t₁ and during the static phase, that signal is translated through diode 116 to the $(+)$ input of voltage follower 110. Because of the gain characteristic of follower 110, the negative-going torque signal appears at the $(-)$ input of comparator 118 at a slightly higher level than the driveline torque signal which is applied directly to the comparator's $(+)$ input. As a consequence, as the torque signal 181 decreases in FIG. 11, the output of comparator 118 remains at logic "0." When the turnaround level is reached, diode 116 will no longer conduct and the voltage on capacitor 117 will hold at the torque minimum. Hence, after turnaround the output voltage of follower 110 remains at a level slightly higher than the voltage level of the minimum torque signal on line 45. As the torque signal then begins to increase slightly, the (+) input of comparator 118 becomes positive relative to the fixed voltage at the comparator's (−) input, whereupon the comparator switches from a logic "0" output to a logic "1" output. When this occurs, a logic "1" command signal is translated to the upper input of OR gate 119, thereby generating a logic "1" signal on line 76 to effect closing of the loop at the point referenced 191 on curve 181 in FIG. 11. Of course, point 191 is essentially the turnaround or minimum point of the torque curve; the small displacement from the true minimum, which is brought about by the small amount of grain inherent in voltage follower 110, is needed to provide noise immunity, that is to prevent premature issuance of the loop closure signal on "noise turnaround."

The driveline torque is thereafter increased from the turnaround point 191 under the control of the first ramp command indicated by construction line 192. When the increasing signal 181 reaches the reset level, a reset pulse is applied to the upper input of AND gate 146 to cycle the gate's output from logic "1" to logic "0" and then back to logic "1." As a result, the closed loop control system is released and reset at the point referenced 193 in FIG. 11. The new second ramp command, designated by line 194, then controls the driveline torque, until the completion of the shift, to produce a high quality upshift with good "feel," in spite of the fact that the signal LC5, indicating zero reaction torque, had not been issued.

FIG. 12 graphically illustrates the operation of the control system in the presence of a very shallow torque dip, one that does not even drop to the reset level. When such a torque characteristic occurs, comparator 118 detects the turnaround point 195 and closes the loop, thereby increasing the driveline torque under the control of the ramp command depicted by construction line 196. Of course, no reset pulse will be developed, nor is such a pulse needed. The upshift shown in FIG. 12 will also be of high quality and will provide a good "feel."

The invention provides, therefore, a unique electronic control system for regulating an upshift gear ratio change in an automatic transmission to optimize the shift quality.

While a particular embodiment of the invention has been shown and described, modifications may be made, and it is intended in the appended claims to cover all such modifications as may fall within the true spirit and scope of the invention.

I claim:

1. An electronic control system for regulating the change of gear ratio in an automatic transmission having a pair of friction elements and an output mechanical driving connection for supplying driveline torque to a load, where an upshift change of gear ratio has an initially occurring static phase, during which one of the friction elements is released and the driveline torque drops to a minimum turnaround level, and a subsequently occurring dynamic phase during which the other friction element is engaged and the driveline torque increases from the turnaround point until the shift is completed, comprising:

monitoring means for sensing the driveline torque at the transmission output driving connection and for producing an output torque signal which varies as a function of the driveline torque;

a closed loop control system having a loop which, when closed, controls the engagement of the on-coming friction element to regulate the driveline torque;

detecting means responsive to said output torque signal for closing the loop, when said driveline torque is generally at its turnaround point, and for causing the driveline torque to increase, from the turnaround point, under the control of a predetermined first ramp command;

and rest means responsive to said output torque signal for releasing and resetting said closed loop control system when the driveline torque increases to a predetermined reset level during the dynamic phase, the driveline torque thereafter increasing from the reset point, under the control of a predetermined second ramp command, until the shift is completed.

2. An electronic control system according to claim 1 wherein said closed loop control system develops a first ramp-shaped signal for controlling the driveline torque between turnaround and reset, and a second ramp-shaped signal for controlling the driveline torque from reset to the completion of the upshift.

3. An electronic control system according to claim 1 wherein said detecting means determines when the reaction torque of the off-going friction element decreases to zero, the loop being closed at that time if the turnaround point has not yet occurred.

4. An electronic control system according to claim 1 wherein the reset level is determined from said output torque signal and is a function of the average driveline torque immediately prior to the static phase of the upshift.

5. An electronic control system according to claim 1 and including a fluid line coupled to a fluid inlet of the transmission and a control valve, connected in the fluid line, for regulating the fluid pressure at said fluid inlet to control the engagement of the on-coming friction element during the dynamic phase of the upshift.

6. An electronic control system according to claim 5 wherein said closed loop control system includes a closed loop controller which receives said output torque signal as a feedback signal and provides an error signal for regulating the operation of said control valve as a function of the error signal.

7. An electronic control system according to claim 6 and including a reaction torque computation circuit, operating in response to said output torque signal, for producing a reaction torque output signal, and further including a logic control circuit, operating in response to said reaction torque signal, for providing a plurality of logic command signals for application to said closed loop controller to control the engagement of the on-coming friction element.

8. An electronic control system according to claim 7 wherein said control valve is a two-position valve with a solenoid for controlling the fluid pressure at said fluid inlet in response to an applied control signal, and including a pulse width modulation circuit, operating in response to said error signal, for applying a control signal to the solenoid to regulate the control valve operation.

9. An electronic control system according to claim 1 wherein the loop, when closed by said detecting means, controls the driveline torque in accordance with input information determined, at least in part, by the output torque signal at the time the loop is closed, and wherein siad reset means, in resetting said closed loop control system, momentarily opens the loop and then immediately closes it, the driveline torque thereafter being controlled in accordance with input information determined, at least in part, by the output torque signal at the time of reset.

* * * * *

UNITED STATES PATENT AND TRADEMARK OFFICE
CERTIFICATE OF CORRECTION

PATENT NO. : 4,220,058

DATED : September 2, 1980

INVENTOR(S) : Werner Paul Petzold

It is certified that error appears in the above—identified patent and that said Letters Patent is hereby corrected as shown below:

Column 18, line 9, cancel "rest" and insert -- reset --.

Signed and Sealed this

Second Day of December 1980

[SEAL]

Attest:

SIDNEY A. DIAMOND

Attesting Officer

Commissioner of Patents and Trademarks